United States Patent [19]
Nainis et al.

[11] Patent Number: 5,325,602
[45] Date of Patent: Jul. 5, 1994

[54] COLLAPSIBLE CORRUGATED BOX

[75] Inventors: Linda Nainis, Chevy Chase, Md.; Robert J. Milevski, Princeton, N.J.

[73] Assignee: Protext, Inc., Chevy Chase, Md.

[21] Appl. No.: 43,853

[22] Filed: Apr. 7, 1993

Related U.S. Application Data

[63] Continuation-in-part of Ser. No. 866,572, Apr. 10, 1992, abandoned.

[51] Int. Cl.$^5$ .............................. F26B 5/06
[52] U.S. Cl. ............................ 34/287; 34/92; 229/120
[58] Field of Search .............. 34/92, 5, 15, 4; 229/119, 120, 150, 155, DIG. 14, DIG. 11; 206/503

[56] References Cited

U.S. PATENT DOCUMENTS

| | | | |
|---|---|---|---|
| 2,257,977 | 10/1941 | Richard | 229/120 |
| 2,374,177 | 4/1945 | Conner et al. | 229/120 |
| 2,727,675 | 12/1955 | Mairs et al. | 229/155 |
| 3,366,496 | 1/1968 | Bomar et al. | 229/119 |
| 3,369,728 | 2/1968 | Royce | 229/120 |
| 3,381,880 | 5/1968 | Lewallen et al. | 229/120 |
| 3,670,949 | 6/1972 | Galanes | 229/120 |
| 3,881,648 | 5/1975 | Hall | 229/120 |
| 4,142,665 | 3/1979 | Jewell et al. | 229/120 |
| 4,313,547 | 2/1982 | Osborne | 229/120 |
| 4,353,495 | 10/1982 | Jes | 229/120 |
| 4,535,929 | 8/1985 | Sherman, II et al. | 229/150 |
| 4,709,852 | 12/1987 | Stoll | 229/119 |
| 5,038,494 | 8/1991 | Lundquist et al. | 34/92 |
| 5,120,500 | 6/1992 | Eggersdorfer et al. | 34/4 |

Primary Examiner—Denise Gromada
Attorney, Agent, or Firm—Howard L. Rose

[57] ABSTRACT

A carton is provided for holding wet books and like materials during transport to and processing at a freezing and freeze drying or vacuum drying facility. The carton is fabricated as a laminated corrugated carton from a high density polymer that may be stored in a flat condition, assembled to hold the books or like and after their processing collapsed for storage. The carton have openings throughout to facilitate extraction of fluids. The cartons are reusable as many as 20 times or more.

5 Claims, 2 Drawing Sheets

COLLAPSIBLE CORRUGATED BOX

RELATED APPLICATIONS

This application is a continuation-in-part of U.S. patent application Ser. No. 07/866,572 filed Apr. 10, 1992 now abandoned..

TECHNICAL FIELD

The present invention relates to a reusable, collapsible, corrugated box for holding wet books for transport to freezers, and during subsequent vacuum freeze drying. More particularly, the present invention relates to such a box fabricated from a strong plastic material having an array of apertures that permit rapid vacuum freeze drying of books that have become soaked with water.

BACKGROUND OF THE INVENTION

If a disaster such as a flood strikes a library, valuable library volumes that have taken years to collect can be completely destroyed by water. Water emergencies are invariably more damaging to books than any other type of disaster, including fire. Unfortunately, water emergencies happen rather frequently in libraries. Water emergencies are caused by a variety of unforeseen problems such as roof leaks, backed up sewer lines, burst pipes, accidental sprinkler system discharge, storm flooding, the result of putting out a fire, among other unforeseen events that often strike without warning. For libraries to salvage books and like materials (hereinafter "books"), that have become water soaked, the standard practice is to place the dripping wet books in a container, freeze the books and then dry them in some manner. After the books have been frozen, the preferred method of drying is vacuum freeze drying. Vacuum freeze drying can be accomplished while the books are in a suitable box that permits air to circulate through the box walls. It has been found that if the books have sustained no damage other than wetting such process can substantially completely restore the books to their original condition, assuming that the initial freezing is undertaken quickly, before fungal growth and decomposition has occurred (usually within 48 to 72 hours).

A problem however arises in that transporting the books to a freeze dry facility requires a voluminous number of carriers, and in order to be prepared to respond quickly to a disaster, it is desirable for libraries to store at least enough carriers to last for the first 24 hours or so until more can be brought in. Generally two types of carries are in use, milk crates or corrugated, cardboard boxes, because both types allow for quick freezing of contents and allow adequate air circulation to facilitate the vacuum freeze drying process.

Unfortunately, an immense storage problem is created for the libraries and vacuum freeze drying facilities that choose to stock milk crates. Apart from the storage problem, however, the commercial milk crate is an ideal carrier because it has bottom and sides molded in a fretwork structure to provide large open spaces, it requires no top for stacking, it is a size that can be handled easily when filled with heavy, wet books, it (the commercial variety) is made of polyethylene so that it has good impact strength at very cold temperatures. Functionally, the milk crates permit rapid drainage, rapid freezing and rapid vacuum freeze drying. From the standpoint of library security, the fact that the milk crate has no top is a slight disadvantage. Nonetheless, milk crates set the standard for this purpose in the industry.

The problem with cardboard boxes is that they soak up water, cannot be reused and at times cannot last even one cycle particularly when the books are very wet. Yet, the California library system stockpiles several thousand cardboard boxes, because they are easily stored, and it is better to have a quantity of cardboard boxes on hand than to have nothing at all in an emergency.

A slight improvement over the plain corrugated box might be boxes that are wax coated to extend their useful lives. Such treatment, however, extends the life of these cartons to maybe two to three uses at best, nowhere near the life span of plastic boxes. Furthermore, the wax coating can produce its own problems. One problem, if the interior surfaces of the cartons are waxed, is that cracking of the wax can cause wax deposits on the covers of the books, particularly books with linen or other coarsely woven surfaces; such a wax deposit could irreparably damage rare books or at least necessitate costly rebinding. An additional problem with wax coated corrugated board is that airflow, necessary to the vacuum freeze drying process, is inhibited by a heavy wax coating. This problem of insufficient airflow can be solved by the strategic placement of enough holes in the container to permit good air circulation, but not so many or such large holes that the container looses its strength. Some wax coated corrugated food boxes may meet these requirements. However, even with the wax coating, migration of water through the wax to the cardboard occurs at times, particularly at folds and at cut edges, where water can be wicked into the interior flutes of the corrugated board. More expensive, more thorough interior and exterior coatings can mitigate this problem. Nevertheless, the life span of coated paperboard containers is still much less than that of plastic boxes. Finally, maintaining the shelf life of wax coated boxes during long term storage can be difficult if the humidity is high (causing moisture absorption) or if the temperature is warm (causing waxed surfaces to stick together).

Another way that library salvage workers have tried to make corrugated boxes last longer is to place large plastic bags inside the boxes before loading the wet books. Then after the books are frozen, the bags are removed for the vacuum freeze drying operation. This is a very labor intensive solution.

OBJECTS OF THE PRESENT INVENTION

It is an object of the present invention to provide a highly ventilated, collapsible, reusable box for holding wet books that will perform as well as a milk crate during a restoration operation involving transportation, freezing and freeze drying of the books. The performance requirements involve additional objectives, related to the different stages of the restoration process:

(1) while the box contents are wet:
  (a) the box must allow the excess water to drain out of the bottom, and in addition,
  (b) the box must have enough strength to hold heavy wet books, and to be stacked up, one on top of another, without collapsing under the weight of the heavy wet books, yet
  (c) the box must be lightweight so as not to add much additional weight to the already heavy, wet books, and (d) the box must be easy and quick to assemble for disaster teams composed of librarians and sometimes volunteers;

(2) during the freezing stage, the box must be able to tolerate extreme temperatures, possibly down to as low as −60° F. if the books are blast frozen or at least down to −20° F. without losing its impact strength at such low temperatures;

(3) when the box and contents are placed in a vacuum to cause the sublimation of water vapor:

(a) the box must allow free circulation of air in all directions, top, bottom, and sides, and (b) it must be strong enough to be stacked about seven boxes high within the vacuum chamber;

(4) during shipping, the boxes must withstand the normal stresses of motor freight; shipping conditions will be different depending upon in which stage of the process the books are:

(a) wet going to the freezer, (b) frozen going to the vacuum freeze dryer, (c) dry being transported back to the library.

It is another object of the invention to provide a box for rescuing wet books that is collapsible like a corrugated box, so that it does not occupy too much space (unlike the milk crate) and so it is easily stored in libraries that wish to be prepared for a water emergency. The storage requirements involve additional objectives, that are:

(1) the box must have a shelf life of at least five to ten years, and (2) it must be able to tolerate storage conditions in basements, attics or other out of the way storage locations that may be moist, hot or cold during some seasons of the year.

It is another object of the invention to provide a box that has durability in use during the restoration process, described above (15-20 times or more). To meet the reusability requirement:

(1) the box must be non-wettable and it must not deteriorate quickly when subjected to the above-described conditions, and (2) it must be easy to clean, particularly after an emergency that involves backed up sewer drains or other unsanitary water situations.

Yet another object of the present invention is to provide security for the contents of the rescue box. The security requirement is necessary for two reasons:

(1) so that when library books are shipped through various commercial channels and to various commercial sites, valuable books are not fully exposed to the eyes of the curious and or the hands of those who might take them from their boxes, and (2) so that when the box is used as a container for a disaster preparation kit being marketed by one of the inventors, the integrity of the contents, including flashlights and other easily pilfered objects, will be insured.

It is still another object of the present invention to provide a box of a size that will be:

(1) large enough to accommodate most library materials in this case, books, standard size files or common size flat documents, (2) and large enough to hold the maximum number of books, so as to reduce the number of boxes that have to be packed and handled during a disaster, but (3) not so large that it would be too heavy to carry by ordinary persons volunteering to help in a library disaster, and (4) of a size and dimensions that can be accommodated by archival shelving and library conveyances (book carts), and (5) large enough to hold a disaster preparation kit that includes a collapsible mop and pail.

It is still another object of the present invention to provide a box that is complete in one piece. The box should not require any extra parts except the nylon security tie or a piece of tape to seal the closure. It should not be necessary to have extra tops to assemble and or plastic bags to insert, as these procedures increase the labor requirements of an already labor intensive activity, of salvaging wet books.

BRIEF DESCRIPTION OF THE PRESENT INVENTION

The present invention provides a collapsible, reusable carton made of an essentially non-wettable plastic with a plurality of strategically located holes of a number and size to permit rapid freezing and subsequent extraction of water and water vapor from the carton at rates substantially the same as a milk crate. The carton is made from a double-faced corrugated material appropriately cut and scored to permit the carton when collapsed to be only two thicknesses of the corrugated material and yet permit rapid assembly when crisis requires it.

The particular material employed in a preferred embodiment of the present invention is a high density polyethylene with a density of 0.950 to 0.962 g/cm$^3$, a melt index of 0.3 to 0.7 g/10 min., a weight of 130 to 550 lb/MSF and Type C flute size available from U.S. Corfulite and others. The thickness and/or weight of the corrugated material is selected in accordance with usage. A laminated material is preferred since it holds its folds better and is stronger than extruded material. Polyethylene is preferred to polypropylene because it has greater impact strength at low temperatures.

All of the panels of the carton have holes, the number and placement of which according to the present invention provide, as proven by tests, drainage, freezing and subsequent drying by freeze or vacuum drying provide a performance substantially equal to that provided by milk crates.

The above and other features, objects and advantages of the present invention, together with the best means contemplated by the inventors thereof for carrying out the invention will become more apparent from reading the following description of a preferred embodiment and perusing the associated drawings in which:

DETAILED DESCRIPTION OF THE INVENTION

Figure 1:
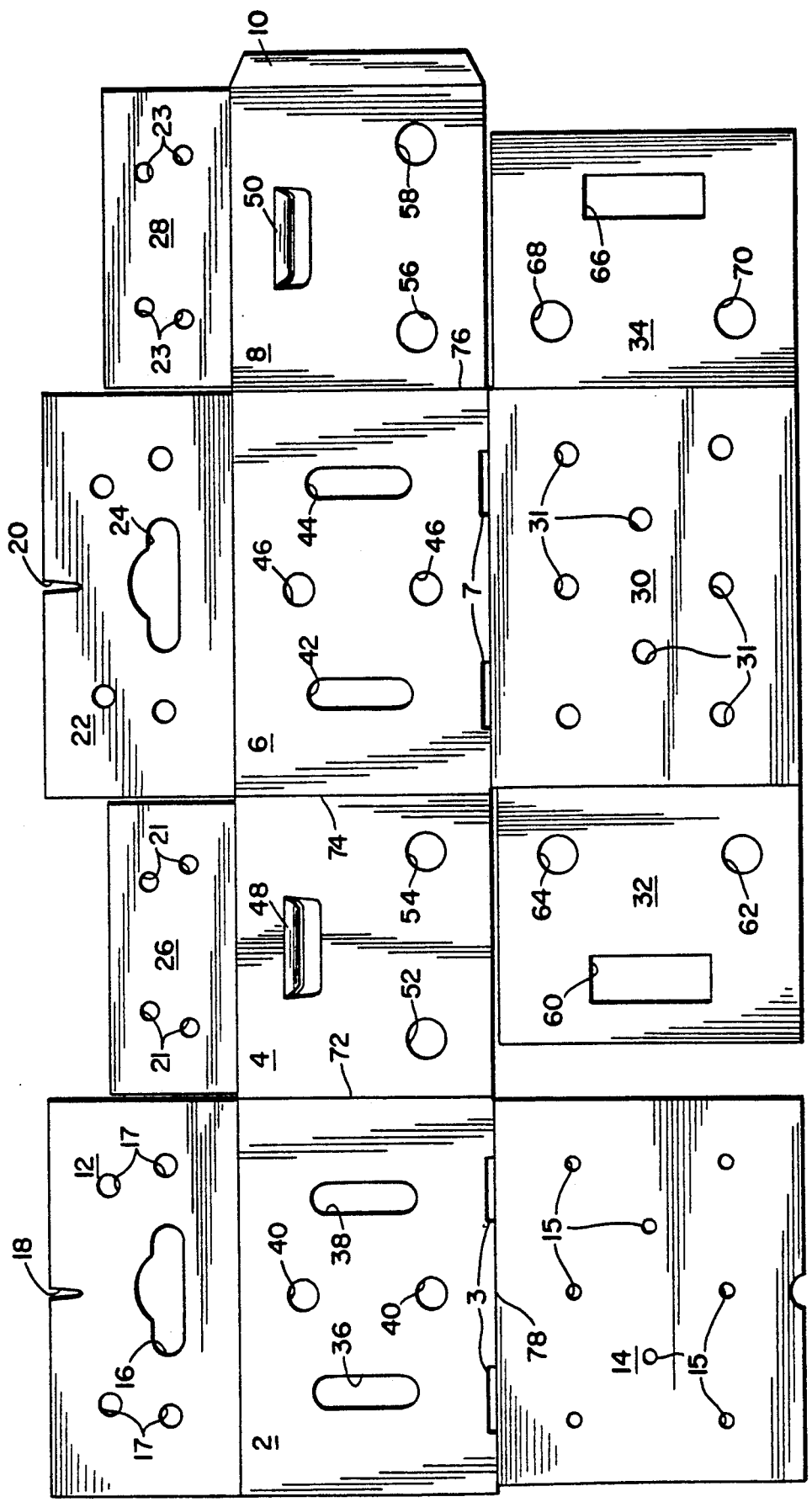
FIG. 1 of the accompanying drawings illustrates the blank from which the carton of the present invention is assembled.

Referring now specifically to FIG. 1 of the accompanying drawings, there is illustrated a blank 1 from which the carton of the present invention is assembled. The blank, which may be stamped out of the laminated corrugated material previously discussed is comprised of 12 panels and an end flap. Specifically, a main rectangular structure consists of panels 2, 4, 6 and 8 with scores or fold lines tamped in at the same time as the blank is cut. Flap 10 is sealed to an end region of panel 2 to form a basic rectangular structure as viewed in FIG. 2.

Panels 12 and 14 extend from the top and bottom, as viewed in FIG. 1, of panel 2 with panel 14 having a plurality of holes 15 (8) and forming the "inner" bottom of the carton when assembled. The panel 12 has an opening 16 for aeration and space to thread a security tie, four holes 17 and a slit 18 to cause panel 12 to mate with a slit 20 in a substantially identical panel 22 extending from the top, as viewed in FIG. 1, of panel 6. Panel 22 also has a security tie hole serving also an aeration opening 24 and holes 19 corresponding to those in panel 12. The openings 16 and 24 are located higher in FIG. 1 than blank panels 26 and 28 extending upwardly from panels 4 and 8 because they serve an additional purpose, that is to provide a place to thread through the self-locking closure device or tie, as discussed more thoroughly below. The panels 26 and 28 have a pattern of holes 21 and 23, respectively, corresponding to the location of holes in panels 12 and 22, respectively, so that when the carton is assembled the holes in the respective panels are aligned.

A panel 30 has holes 31 that align with the eight holes 15 of panel 14 when the carton is assembled. The panel 30 extends downwardly from panel 6 and has panels 32 and 34 extending to the left and right, respectively. Panels 12, 26, 22 and 28 are separated from one another as panels 32 and 34 are separated respectively from panels 4 and 8.

Panels 2 and 6 have a pair of spaced vertical slits 36 and 38 and holes 40 for aeration. Panel 6 has corresponding vertical slits 42 and 44 and holes 46. Panels 4 and 8 have hand holes 48 and 50, respectively with holes 52 and 54 in panel 4 and holes 56 and 58 in panel 8.

When assembled panel 32 lies inwardly of panel 4 with a hand hole 60 aligned with hand hole 48 and holes 62 and 64 aligned with holes 52 and 54. Correspondingly panel 34 has a hand hole 66 that aligns with hand hole 50 of panel 8 while holes 68 and 70 align with holes 56 and 58.

The pattern of holes illustrated has proven by tests that the performance of the carton during vacuum freeze drying illustrated is substantially the same as that of a milk crate.

Additional drainage, important when the box contents are dripping, is provided by draining slots 3 and 7 associated with panels 2 and 6.

Figure 2:
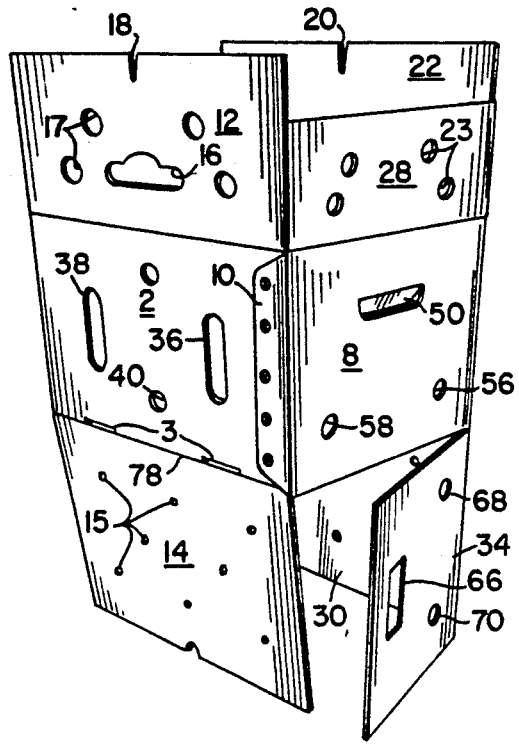
FIGS. 2-4 illustrate the carton through its various stages of assembly.

Referring to FIG. 2 the carton is illustrated partially assembled with each of the panels bent at fold lines 72, 74 and 76 into a rectangle with flap 10 glued or fused or welded to the reverse side of panel 2 as illustrated in FIG. 1.

Figure 3:
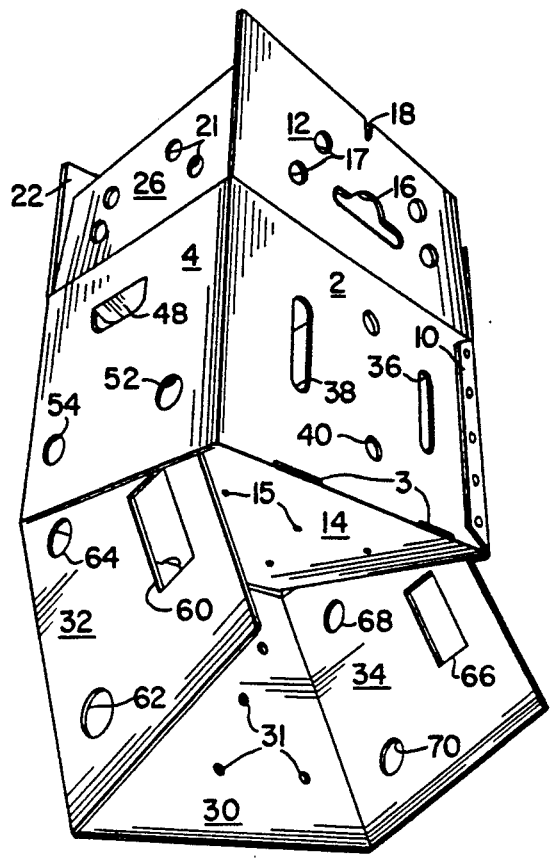

In FIG. 3 the flap 14 is folded along fold line 78 to a position lying between the bottom edges of panels 2, 4, 6 and 8. The panels 32 and 34 are folded at right angles to panel 30 and the panel 30 is partially rotated with respect to panel 6. When rotated fully 90° the panel 32 lies against and inwardly of panel 4 with the hand holes and aeration holes aligned. Correspondingly panel 34 lies against and inwardly of panel 8 with the various openings aligned. Outer lamination of the corrugated board may be coated with a non-skid surface to prevent slippage if the cartons are stacked.

Figure 4:
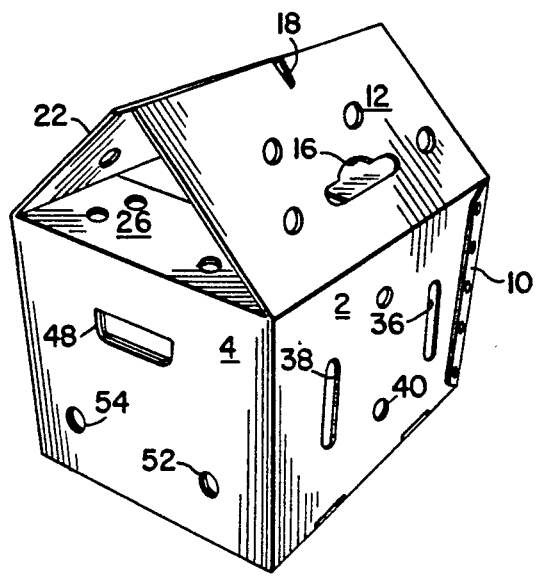

Referring to FIG. 4, the panels 26 and 28 are folded at 90°, respectively, to panels 4 and 6 to give strength and to form a partial top for the carton. The panels 12 and 22 are then folded over the top with the slits 18 and 20 interlocked to provide a latching arrangement for the panels to complete the carton. Note that the openings 16 and 24 lie away from panels 26 and 28 so that openings are available at the top of the carton.

As emphasized herein, the placement and size of the various slits and holes are quite important since in the freezing and vacuum freeze drying processes, complete access to all regions of the carton is required. Also it is important that the openings be located so that they do not materially reduce the strength of the carton while as indicated immediately above providing ample access to the interior of the carton to permit the freezing temperatures to proceed through the carton and later permit the moisture to be extracted.

The carton is stored in the collapsed condition with the panels 12, 22, 26, 28, 14, 32, 30 and 34 positioned as illustrated in FIG. 1. The flap 10 remains glued or welded to the back of panel 2 so that panels 6 and 8 overlie panels 4 and 2, respectively.

To disassemble the carton for storage the panels 12, 22, 26 and 28 are realigned with panels 2, 6, 4 and 8, respectively. The outer bottom member 30 is pulled down taking with it panels 32 and 34 and the panel 14 is pulled down so that the rectangle may be flattened.

Various materials may be employed for the carton, laminated corrugated plastic polyethylene material of the type mentioned above being readily available and highly suitable because of its impact strength at low temperatures (unlike polypropylene).

The size of a box for salvaging wet materials is important. For efficiency, the number of boxes packed and handled during a disaster should be kept to a minimum. In addition, boxes must be large enough to handle most library books. However, if boxes are too large, the contents may freeze slowly and non-uniformly. Furthermore, the boxes should not be too large, because wet books and documents are very heavy. Boxes must be manageable, to minimize the likelihood of being dropped (causing more damage to the wet contents) by salvage team workers, who may be volunteers unaccustomed to packing, loading and lifting boxes for hours on end during a disaster. When filled with about one cubic foot of wet material, the prototype box, which is 15-½"×12" by 10" in height, will weight about 50 pounds, a weight that can be carried by most adults.

The size of the box prototype is within one inch of the size of a standard records center box (15"×12"×10") that can hold letter size folders in one direction and legal size in the other direction, so that it too can be used for archives and business files. In addition, by making the box about an inch longer than a standard records box it is possible for this box to accommodate the assorted products that can be packed inside the box when it is used for another of its functions: to hold a disaster preparation kit, that includes a pail and a mop. The increased length of the box is still within the profile of the standard records center boxes if one includes the dimensions of the standard boxes' overlapping top lids. So, if placed side by side on standard archival shelving, these rescue boxes will not protrude any farther into the aisle than the standard boxes.

The concept, however, is not limited to the size of the prototype, because various boxes of this type should be made available to accommodate different dimensions of materials needing restoration after a disaster, including maps, prints, drawings and oversized volumes, keeping in mind human factors and materials attributes.

Another design feature of the box, is that it can be locked, using a 15" nylon tie threaded through the top slots, numbered 16 and 24 in the diagram. These nylon ties are adjustable, and self-locking and are used extensively in the electrical industry for fastening low voltage wiring and cables neatly. Law enforcement officers even use a variation of this idea for handcuffs. Once the tie is in place, it cannot be disconnected except by cutting. While the ties are readily available in the marketplace, they are not so common that most ordinary citizens would have a supply on hand, and that provides security against removal and replacement. Thus, libraries, archives and records centers that are using outside personnel to transport valuable books and papers away from the custodial site would have the added security of knowing whether the boxes had been tampered with. Likewise, the nylon tie would secure the kit of disaster preparation supplies and equipment, such as flashlights and other easily pilfered items. A cut nylon tie provides a clear signal that the box had been opened, and will alert librarians and records center personnel that the integrity of the box contents may have been jeopardized.

Many variations and modifications of the above-described embodiments are within the ordinary skill of the skilled artisan in this art, without departing from the scope of the invention. Accordingly those modifications and embodiments are intended to fall within the scope of the invention as defined by the following claims.

What is claimed is:

1. The method of salvaging books that have been soaked by water comprising the steps of
    assembling a box of non-wettable, strong material from a flat blank having a plurality of openings providing large open areas in its bottom, top, sides and end members, to permit rapid extraction of water from the box,
    placing the wet books in the box and transporting them to a freezer facility,
    freezing the books, and
    freeze drying the books to extract water from the books within the box.

2. The method of salvaging books according to claim 1 wherein
    freeze drying is done by vacuum freeze drying.

3. The method of salvaging books that have been soaked by water comprising the steps of
    assembling a stackable box of a strong corrugated plastic material capable of withstanding temperatures as low as $-20°$ F. from a flat blank having a plurality of large openings in all members of its bottom, all top closing members, all side members and all end members, to permit rapid freezing of and extraction of water from books assembled therein,
    placing wet books in the box,
    closing the top of the box,
    transporting the box to a freezer facility,
    freezing the books, and
    vacuum freeze drying the books to rapidly extract water from the books in the form of water vapor.

4. The method of salvaging books according to claim 3,
    providing hand holes in the end walls in addition to the other openings therein.

5. The method of salvaging books according to claim 3,
    constructing said box of a material that can withstand $-60°$ F.

* * * * *